United States Patent
Fay

(10) Patent No.: US 7,624,797 B2
(45) Date of Patent: Dec. 1, 2009

(54) DOWNHOLE TOOL OPERATED BY SHAPE MEMORY MATERIAL

(75) Inventor: Peter J. Fay, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 171 days.

(21) Appl. No.: 11/487,221

(22) Filed: Jul. 14, 2006

(65) Prior Publication Data

US 2008/0011472 A1 Jan. 17, 2008

(51) Int. Cl.
*E21B 23/00* (2006.01)
*E21B 23/04* (2006.01)

(52) U.S. Cl. ............. 166/215; 166/134; 166/206; 166/214

(58) Field of Classification Search .......... 166/381, 166/382, 242.1, 215, 214
See application file for complete search history.

(56) References Cited

U.S. PATENT DOCUMENTS

| | | | |
|---|---|---|---|
| 4,423,777 A * | 1/1984 | Mullins et al. ............. 166/120 |
| 4,424,865 A | 1/1984 | Payton, Jr. | |
| 4,484,955 A | 11/1984 | Hochstein | |
| 4,515,213 A * | 5/1985 | Rogen et al. ............. 166/123 |
| 4,619,320 A * | 10/1986 | Adnyana et al. ......... 166/66.7 |
| 4,640,354 A * | 2/1987 | Boisson ............. 166/250.01 |
| 4,745,973 A * | 5/1988 | Semar ................. 166/217 |
| 5,103,901 A * | 4/1992 | Greenlee ............. 166/120 |
| 5,159,145 A * | 10/1992 | Carisella et al. ........... 89/1.15 |
| 5,199,497 A * | 4/1993 | Ross ................ 166/381 |
| 5,203,414 A * | 4/1993 | Hromas et al. .......... 166/382 |
| 5,226,979 A | 7/1993 | Thoma | |
| 5,346,014 A * | 9/1994 | Ross ................ 166/297 |
| 5,626,581 A | 5/1997 | Staehlin et al. | |
| 5,829,531 A * | 11/1998 | Hebert et al. ........... 166/382 |
| 5,878,818 A * | 3/1999 | Hebert et al. ........... 166/382 |
| 6,062,315 A * | 5/2000 | Reinhardt ............ 166/381 |
| 6,216,779 B1 * | 4/2001 | Reinhardt ............. 166/57 |
| 6,321,845 B1 | 11/2001 | Deaton | |

(Continued)

FOREIGN PATENT DOCUMENTS

WO        WO 99/66202        12/1999

(Continued)

OTHER PUBLICATIONS

Coronado, Martin P., Advanced Openhole Completions Utilizing a Simplified Zone Isolation System, SPE 77438; Sep.-Oct. 2002, 1-11.

(Continued)

*Primary Examiner*—David J Bagnell
*Assistant Examiner*—Cathleen R Hutchins
(74) *Attorney, Agent, or Firm*—Steve Rosenblatt

(57) ABSTRACT

The invention features the use of a shape memory material in a downhole application to provide an energy source for at least in part setting the tool. In a specific application the springs that set slips for a liner hanger are made from the shape memory material and easily pre-compressed below the transition temperature when the material has low modulus of elasticity. The tool is run into position where a heat source such as well fluids or a heater can bring the springs above the transition temperature to store a force. The tool is then independently released to allow the stored force to set the tool.

17 Claims, 3 Drawing Sheets

U.S. PATENT DOCUMENTS

| | | |
|---|---|---|
| 6,349,767 B2 | 2/2002 | Gissler |
| 6,427,712 B1 | 8/2002 | Ashurst |
| 6,433,991 B1 | 8/2002 | Deaton et al. |
| 6,436,223 B1 | 8/2002 | Edwards et al. |
| 6,497,288 B2 * | 12/2002 | George et al. ............... 166/377 |
| 6,626,916 B1 | 9/2003 | Yeung et al. |
| 6,763,899 B1 | 7/2004 | Ossia et al. |
| 6,843,322 B2 | 1/2005 | Burtner et al. |
| 6,896,063 B2 | 5/2005 | Chang et al. |
| 2002/0023759 A1 * | 2/2002 | Deaton ....................... 166/381 |
| 2004/0194969 A1 * | 10/2004 | Hiorth et al. ................ 166/382 |
| 2006/0207771 A1 * | 9/2006 | Rios et al. ................... 166/382 |

FOREIGN PATENT DOCUMENTS

WO   2004018833 A1   3/2004

OTHER PUBLICATIONS

Song, G. Z., An Innovative Ultradeepwater Subsea Blowout Preventer (SSBOP) Control System Using Shape Memory Alloy Actuators, IADC/SPE 99041, Feb. 2006., 1-7.

Ma, Ning U., Design and Performance Evaluation of an Ultradeepwater Subsea Blowout Preventer Control System Using Shape Memory Alloys Actuators, SPE 101080, Sep. 2006, 1-8.

* cited by examiner

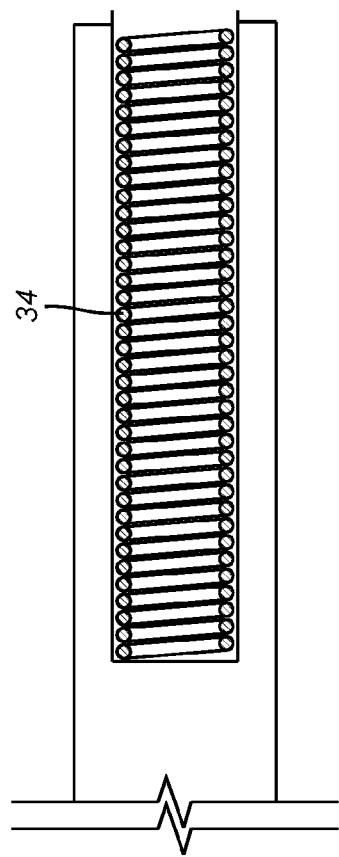
FIG. 2 (UNSET)
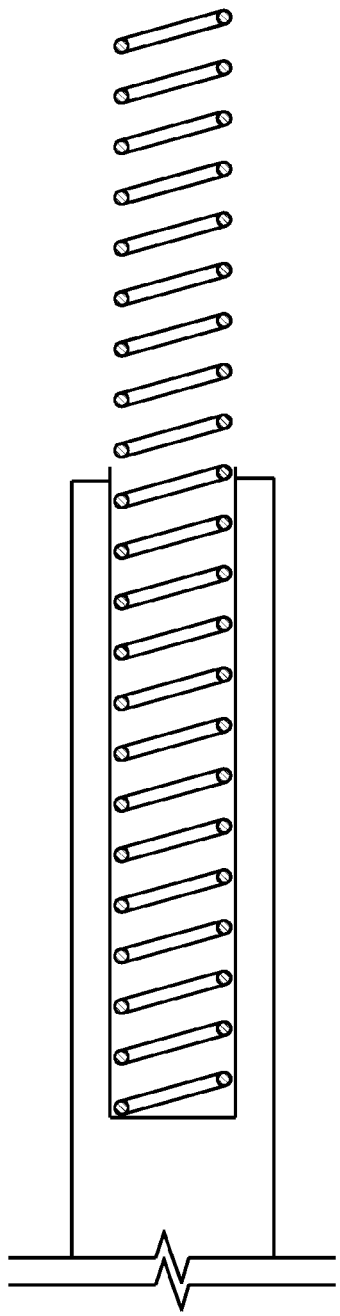
FIG. 3 (SET)

DOWNHOLE TOOL OPERATED BY SHAPE MEMORY MATERIAL

FIELD OF THE INVENTION

The field of the invention is downhole tools and more particularly tools that operate using a potential energy source and most particularly where the energy source is a biasing member made of a shape memory material.

BACKGROUND OF THE INVENTION

Shape memory materials are materials that revert to an original shape once reaching a transition temperature. They typically exhibit high moduli of elasticity and high yield strengths above said transition temperature and comparatively low moduli and low yield strengths below the transition temperature. Such materials have been used to make coiled springs, as illustrated in U.S. Pat. No. 6,427,712; leaf springs, as shown in U.S. Pat. No. 6,436,223 and hollow tube springs, as shown in U.S. Pat. No. 5,226,979. Shape memory materials have been used in downhole tool applications to move components that actuate the tool directly in response to an energy input usually from a heating element. Some examples of downhole tool applications are U.S. Pat. Nos. 5,199,497; 6,216,799 and 6,349,767. Sometimes more than one device operated by shape memory material can be incorporated into a single tool. U.S. Pat. No. 6,433,991 shows a tool that uses a first shape memory device to move a sleeve and a second independently operated shape memory device to act as a ratchet that locks the just shifted sleeve into a position that the first device just moved it to.

Despite all these applications of shape memory materials, the present invention presents a different perspective on their use in downhole applications. Many downhole tools use a bias force to set. These tools have to be assembled at the surface using specialized equipment to pre-compress springs in retaining bores and hold the springs in that position as the tool is being assembled. There are risks to this procedure in that the spring may come loose and potentially cause injury to assembly personnel when the springs take off as projectiles. The springs can also fail during the assembly process where they are pre-compressed sending pieces into the air as projectiles that again can injure assembly personnel. Apart from the safety issues during assembly, there are the operational issues that arise from the way temperature is used to change phases of shape memory materials. If heat is added artificially, then the tool has to be configured to contain a heating element in close proximity to the shape memory material so that the desired phase change is accomplished. On the other hand, if the phase change in the shape memory material is to be initiated using the surrounding well fluid, prior applications that simply use exposure to such fluid could be prone to actuation due to prolonged exposures above the transition temperature well before the tool reaches the desired location.

The present invention addresses these issues. In the preferred embodiment of springs in a downhole tool, it provides for use of a shape memory material for the springs. The tool length can be shortened using such material for the springs in that they can be compressed to greater percentages of their free length than standard spring materials. The low modulus of shape memory materials means less force is needed to pre-compress them during assembly thus removing some level of risk from the assembly process. Also in the preferred embodiment, the crossing over the transition temperature simply energizes the springs without setting the tool. Some independent act is still undertaken to set the tool as to allow the tool to be properly positioned in the well before it is set as opposed to simply setting it when the transition temperature is crossed. These and other aspects of the present invention will be more apparent to those skilled in the art from a review of the description of the preferred embodiment and associated drawings, while the full scope of the invention can be found from a review of the appended claims.

SUMMARY OF THE INVENTION

The invention features the use of a shape memory material in a downhole application to provide an energy source for at least in part setting the tool. In a specific application the springs that set slips for a liner hanger are made from the shape memory material and easily pre-compressed below the transition temperature when the material has low modulus of elasticity. The tool is run into position where a heat source such as well fluids or a heater can bring the springs above the transition temperature to store a force. The tool is then independently released to allow the stored force to set the tool.

BRIEF DESCRIPTION OF THE DRAWINGS

FIG. 2 shows one of the springs in FIG. 1 pre-compressed at below its transition temperature; and FIG. 3 shows the spring of FIG. 2 enlarged after it is raised above its transition temperature and has set the tool of FIG. 1.

DETAILED DESCRIPTION OF THE PREFERRED EMBODIMENT

Figure 1:
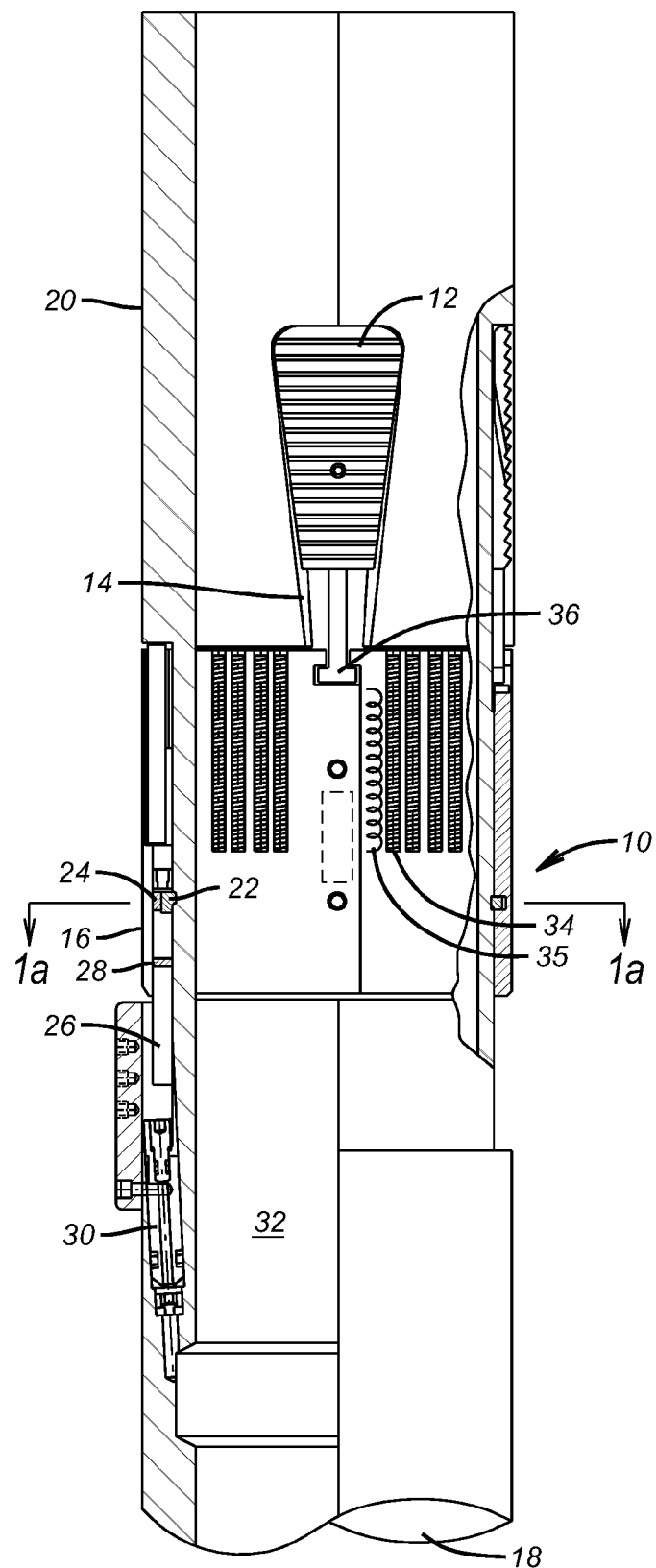
FIG. 1 is a section view of a liner hanger using springs made from a shape memory material.
Figure 1A:
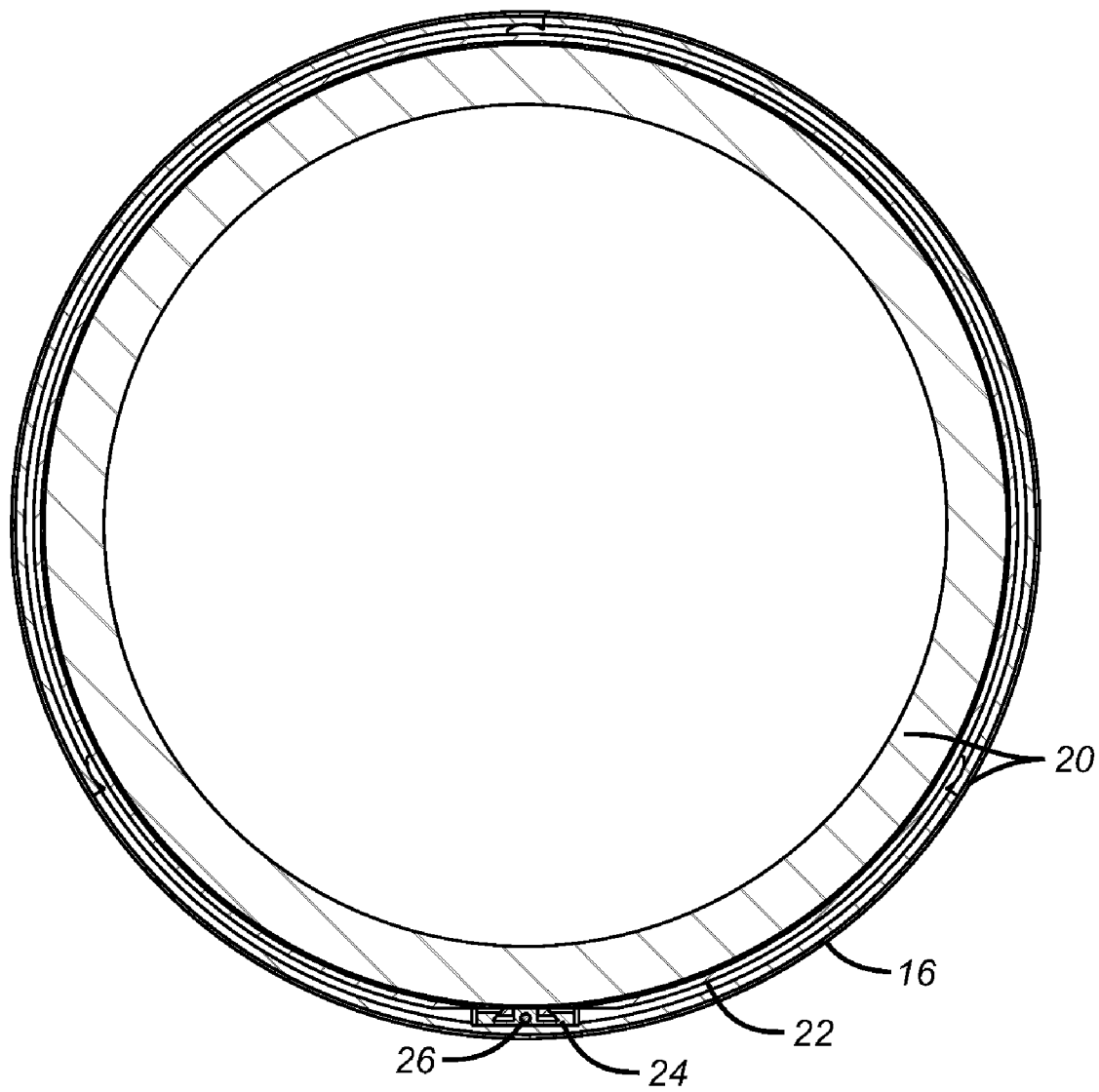
FIG. 1a is a section view along line 1a-1a of FIG. 1.

FIG. 1 shows a liner hanger 10 that features slips 12 that ride on dovetails 14 to move the slips 12 radially outwardly of body 20 so that the surrounding tubular string can be engaged for support of another tubular string (not shown) that extends from the lower end 18 of the hanger 10. The housing 16 is retained to the body 20 by a snap ring 22 held by a retainer 24. An actuation rod 26 is initially pinned to housing 16 by a pin 28. A piston 30 is responsive to pressure in passage with a heat source 32 to move into contact with rod 26 to move the retainer 24 away from the snap ring 22. When that happens the springs 34 can push the housing 16 down with respect to the slips 12 to get the slips to move along dovetails 14 to their set positions. Slips 12 have a t-shaped portion 36 to allow them to move in tandem with the housing 16. While 8 springs 34 are shown, those skilled in the art can appreciate that different numbers or types of springs or biasing devices can be used within the scope of the invention.

The springs 34 are preferably coiled springs to get the required power to move the slips 12 during the required stroke length. The springs are preferably made of a shape memory material such as Nitinol® and are pre-compressed at below their transition temperature where their modulus is fairly low. This reduces the force required to compress them for assembly and install them. The safety risks to assembly personnel are thus reduced due to this lower energy input to the springs. FIG. 2 shows a spring in the compressed state upon assembly at a temperature below the transition temperature.

After the tool of FIG. 1 is run into the well to the desired location, the well fluids can be warm enough to exceed the transition temperature. The springs 34 after being subjected to this temperature will want to return to their original length as they get stiffer. However, in the hanger 10 of FIG. 1 as the spring try to get longer their growth will be stopped by the fact that the housing 16 is still locked by snap ring 22 against movement. What actually happens is that a potential energy force is created and trapped as the springs 34 get stiffer and try to grow or grow to some extent. Independently, after this happens, the piston 30 is actuated to remove support for the snap ring 22 and that lets the springs 34 grow or grow further as they push the housing 16 which in turn pulls the slips 12 along their dovetails 14 to move them radially outwardly for a set of the tool. In essence, the springs 34 can be said to be selectively locked until released and it is equally valid to state that the slips 12 are locked until released. Either way, with the transition temperature crossed, something is locked that is independently released be it the component that is made from the shape memory material or an element of the downhole tool whose movement distinguishes the run in from the set position of the tool.

While use of well fluids has been illustrated as the heat source to raise the springs beyond their transition temperature, other heat sources can be used such as an electric heating coil 35, for example. The tool is not set just because the springs 34 are energized to store potential energy by being raised to above their transition temperature. Instead in the case of the hanger 10 a ball (not shown) is landed on a seat (not shown) so that pressure can be built up on the piston 30 to unlock the housing 16 so that the tool can set in the manner described above. Those skilled in the art will realize that the manner of locking the tool after the transition temperature is crossed can be varied. The tool is not automatically set only by virtue of application of enough heat to the springs 34. In that way, the tool is not set prematurely especially when relying on temperatures of well fluids downhole as the heat source to cross the transition temperature with the shape memory material, which in this embodiment happens to be the springs 34. Those skilled in the art will further understand that a separate act occurs to set the tool after the transition temperature of the shape memory material occurs, regardless of the nature of the tool or which component is made from the shape memory material or which material that has shape memory is actually selected.

While the springs 34 have been described as being made from a shape memory material, in a given tool other and/or additional components can be made of such a material. In fact, the part that could be referred to as the last component to move to define a set position in the tool and/or other parts in between that move when the tool is set could be made from a shape memory material in conjunction with a lock that prevents a tool set position and still be within the scope of the invention.

The above description is illustrative of the preferred embodiment and many modifications may be made by those skilled in the art without departing from the invention whose scope is to be determined from the literal and equivalent scope of the claims below.

I claim:

1. A downhole tool for a subterranean cavity extending from the surface and capable of a run in and a set position, comprising:
a body;
a component on said body made from a shape memory material that is capable of changing dimension when a temperature of said component crosses a transition temperature, said component building potential energy when restrained against movement when the temperature of said component is raised above said transition temperature;
a lock to selectively allow energy developed in said component upon reaching said transition temperature, to thereafter be selectively released from the surface to put the tool in said set position, said lock releasing independently of said potential energy developed in said component.

2. The downhole tool of claim 1, further comprising:
a final element selectively movable by said component to define the set position of said tool;
said component attains said transition temperature from exposure to fluids downhole.

3. The downhole tool of claim 2, wherein:
said body further comprises a heat source to attain said transition temperature in said component.

4. The downhole tool of claim 2, wherein:
said component exerts a bias force on said final element when the transition temperature of said component is reached.

5. The downhole tool of claim 4, wherein:
said component comprises at least one spring.

6. The downhole tool of claim 5, wherein:
said spring is coiled.

7. The downhole tool of claim 5, wherein:
said spring is mounted in said body in a precompressed condition.

8. The downhole tool of claim 7, wherein:
said spring is precompressed when inserted in said body while said spring is below the transition temperature for said spring.

9. The downhole tool of claim 7, wherein:
said spring comprises coils that contact each other when said spring is precompressed.

10. The downhole tool of claim 5, wherein:
said spring develops and stores a force when the temperature of said spring crosses said transition temperature without moving said final element to said set position.

11. The downhole tool of claim 10, wherein:
said spring changes length while developing said force.

12. The downhole tool of claim 10, wherein:
said spring does not change length while developing said force.

13. The downhole tool of claim 10, wherein:
said stored force is released by movement of said lock.

14. The downhole tool of claim 13, wherein:
said lock is not moved by heat supplied to make said component reach said transition temperature.

15. The downhole tool of claim 13, wherein:
said spring grows in length to move said final element to the set position after said lock is moved.

16. The downhole tool of claim 5, wherein:
said spring is made of an alloy of nickel and titanium.

17. A downhole tool capable of a run in and a set position, comprising:
a body;
a component on said body made from a shape memory material that is capable of changing dimension when a temperature of said component crosses a transition temperature;
a lock to selectively allow energy developed in said component upon reaching said transition temperature, to thereafter be released to put the tool in said set position;

a final element selectively movable by said component to define the set position of said tool;

said component attains said transition temperature from exposure to fluids downhole;

said component exerts a bias force on said final element when the transition temperature of said component is reached;

said component comprises at least one spring;

said spring develops and stores a force when the temperature of said spring crosses said transition temperature without moving said final element to said set position;

said stored force is released by movement of said lock;

said body further comprises a piston responsive to pressure within said body to move said lock.

* * * * *